US007667711B2

(12) United States Patent
Miyagi

(10) Patent No.: US 7,667,711 B2
(45) Date of Patent: Feb. 23, 2010

(54) IMAGE PROCESSING SYSTEM, A METHOD THEREOF, AND A RECORDING MEDIUM THEREOF

(75) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 412 days.

(21) Appl. No.: 11/449,132

(22) Filed: Jun. 7, 2006

(65) Prior Publication Data

US 2006/0274332 A1    Dec. 7, 2006

(30) Foreign Application Priority Data

Jun. 7, 2005    (JP) ............... 2005-166963

(51) Int. Cl.
*G09G 5/00* (2006.01)
(52) U.S. Cl. .................. 345/581; 345/428; 345/582; 345/589; 345/600; 345/605; 345/698
(58) Field of Classification Search ........... 345/243, 345/233, 244
See application file for complete search history.

(56) References Cited

U.S. PATENT DOCUMENTS

| 5,333,212 | A | * | 7/1994 | Ligtenberg | 382/250 |
| 5,864,651 | A | * | 1/1999 | Lavie et al. | 358/1.15 |
| 6,167,442 | A | * | 12/2000 | Sutherland et al. | 709/217 |
| 6,633,681 | B2 | * | 10/2003 | Ueda | 382/243 |
| 6,788,331 | B1 | * | 9/2004 | Sacca | 348/14.01 |
| 6,853,466 | B1 | * | 2/2005 | Harada et al. | 358/1.9 |
| 7,127,113 | B2 | * | 10/2006 | Ohnishi | 382/233 |
| 2003/0123092 | A1 | * | 7/2003 | Toda | 358/2.1 |
| 2003/0123346 | A1 | * | 7/2003 | Ishii et al. | 369/47.2 |
| 2003/0135742 | A1 | * | 7/2003 | Evans | 713/189 |
| 2004/0032968 | A1 | * | 2/2004 | Andrew et al. | 382/100 |
| 2004/0208368 | A1 | * | 10/2004 | Yoshida | 382/173 |

FOREIGN PATENT DOCUMENTS

| JP | H07-182503 | 7/1995 |
| JP | H10-243210 | 9/1998 |
| JP | H11-146274 | 5/1999 |
| JP | 2000-011191 | 1/2000 |
| JP | 3471915 | 9/2003 |
| JP | 2004-228811 | 8/2004 |

* cited by examiner

*Primary Examiner*—Kee M Tung
*Assistant Examiner*—Jwalant Amin
(74) *Attorney, Agent, or Firm*—Blakely, Sokoloff, Taylor & Zafman LLP

(57) ABSTRACT

An image processing system, a method thereof, and a recording medium thereof are disclosed. The image processing system includes a command converting unit for reading object information contained in a drawing command, and generating an attribute image; a resolution reducing unit for generating a low-resolution attribute image and a mixture flag that indicates that two or more objects are intermingled in a block of, e.g., 4×4 pixels; and a storing unit for storing a RGB image compressed by a compressing unit, the low-resolution attribute image, and the mixture flag.

16 Claims, 21 Drawing Sheets

FIG.2

| ATTRIBUTE SIGNAL | OBJECT |
|---|---|
| 00 | IMAGE |
| 01 | GRAPHIC |
| 10 | THIN-LINE DRAWING |
| 11 | CHARACTER |

E: TARGET BLOCK

FIG.13

LOW-RESOLUTION ATTRIBUTE IMAGE AND MIXTURE FLAG

| G | G | C (F) |
|---|---|---|
| G | C (F) | G |
| C (F) | G | G |

(a)

SUBBLOCK ATTRIBUTE PREDICTION RESULT

| G | G | G | G | G | C |
|---|---|---|---|---|---|
| G | G | G | G | C | G |
| G | G | G | C | G | G |
| G | G | C | G | G | G |
| G | C | G | G | G | G |
| C | G | G | G | G | G |

(b)

TARGET BLOCK: WEIGHTED NUMBERS OF OBJECTS

| C : 0 <br> G : 8 | C : 4 <br> G : 4 |
|---|---|
| C : 4 <br> G : 4 | C : 0 <br> G : 8 |

(c)

PIXEL PREDICTION RESULT

| G | G | G | G | G | G | G | G | G | G | C |
|---|---|---|---|---|---|---|---|---|---|---|
| G | G | G | G | G | G | G | G | G | C | G |
| G | G | G | G | G | G | G | G | C | G | G |
| G | G | G | G | G | G | G | C | G | G | G |
| G | G | G | G | G | G | C | G | G | G | G |
| G | G | G | G | G | C | G | G | G | G | G |
| G | G | G | G | C | G | G | G | G | G | G |
| G | G | G | C | G | G | G | G | G | G | G |
| G | G | C | G | G | G | G | G | G | G | G |
| G | C | G | G | G | G | G | G | G | G | G |
| C | G | G | G | G | G | G | G | G | G | G |

LOW-RESOLUTION ATTRIBUTE IMAGE AND MIXTURE FLAG

| C | C (F) | G |
|---|---|---|
| C (F) | G (F) | G |
| G | G | G |

(a)

SUBBLOCK ATTRIBUTE PREDICTION RESULT

| C | C | C | G | G | G |
|---|---|---|---|---|---|
| C | C | C | G | G | G |
| C | C | C | G | G | G |
| G | G | G | G | G | G |
| G | G | G | G | G | G |
| G | G | G | G | G | G |

(b)

TARGET BLOCK: WEIGHTED NUMBERS OF OBJECTS

| C : 6  G : 1 | C : 2  G : 7 |
|---|---|
| C : 2  G : 7 | C : 0  G : 9 |

(c)

PIXEL PREDICTION RESULT

| C | C | C | C | C | C | G | G | G | G | G | G |
|---|---|---|---|---|---|---|---|---|---|---|---|
| C | C | C | C | C | C | G | G | G | G | G | G |
| C | C | C | C | C | C | G | G | G | G | G | G |
| C | C | C | C | C | C | G | G | G | G | G | G |
| C | C | C | C | C | C | G | G | G | G | G | G |
| C | C | C | C | C | C | G | G | G | G | G | G |
| C | C | C | C | C | C | G | G | G | G | G | G |
| G | G | G | G | G | G | G | G | G | G | G | G |
| G | G | G | G | G | G | G | G | G | G | G | G |
| G | G | G | G | G | G | G | G | G | G | G | G |
| G | G | G | G | G | G | G | G | G | G | G | G |
| G | G | G | G | G | G | G | G | G | G | G | G |

| ATTRIBUTE SIGNAL | OBJECT | |
|---|---|---|
| 0000 | IMAGE | |
| 0001 | GRAPHIC | |
| 0010 | THIN-LINE | |
| 0011 | CHARACTER | |
| 0100 | MIX OF IMAGE AND GRAPHIC | ⎫ |
| 0101 | MIX OF IMAGE AND THIN-LINE | |
| 0110 | MIX OF IMAGE AND CHARACTER | |
| 0111 | MIX GRAPHIC AND THIN-LINE | |
| 1000 | MIX OF GRAPHIC AND CHARACTER | |
| 1001 | MIX OF THIN-LINE AND CHARACTER | ⎬ MIXTURE FLAG |
| 1010 | MIX OF IMAGE, GRAPHIC AND THIN-LINE | |
| 1011 | MIX OF IMAGE, GRAPHIC, AND CHARACTER | |
| 1100 | MIX OF IMAGE AND THIN-LINE | |
| 1101 | MIX OF GRAPHIC, THIN-LINE, AND CHARACTER | |
| 1111 | MIX OF IMAGE, GRAPHIC, THIN-LINE, AND CHARACTER | ⎭ |

FIG.19
(a)
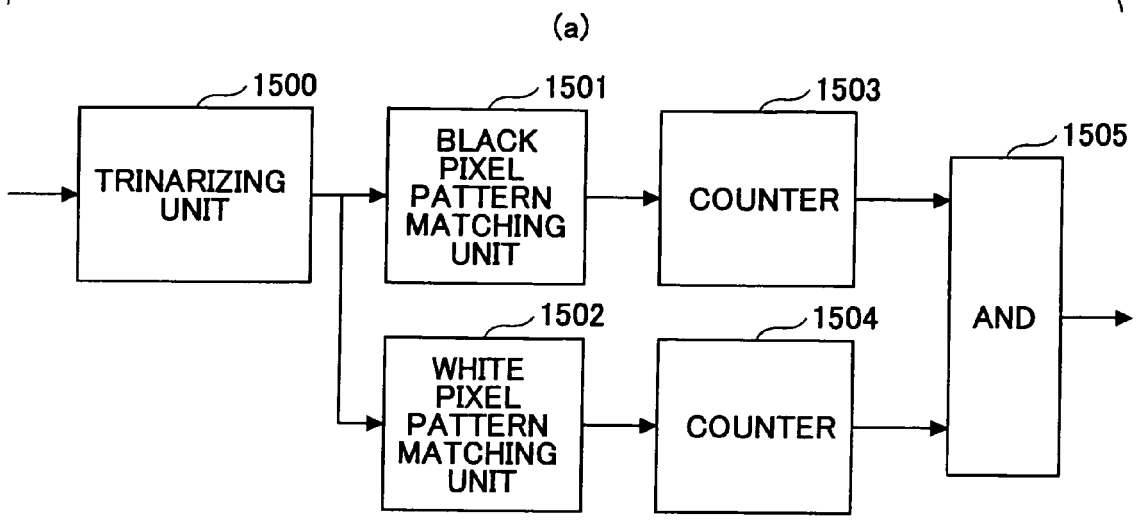
(b)
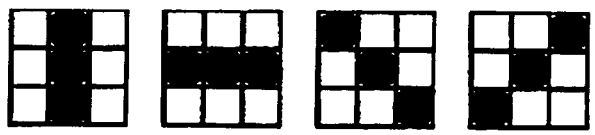
● BLACK PIXEL
OTHER PIXELS ARE OF NO CONCERN
TARGET PIXEL AT CENTER
(c)
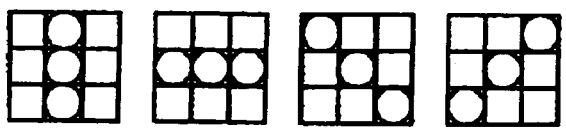
○ WHITE PIXEL
OTHER PIXELS ARE OF NO CONCERN
TARGET PIXEL AT CENTER FIG.20
(a)
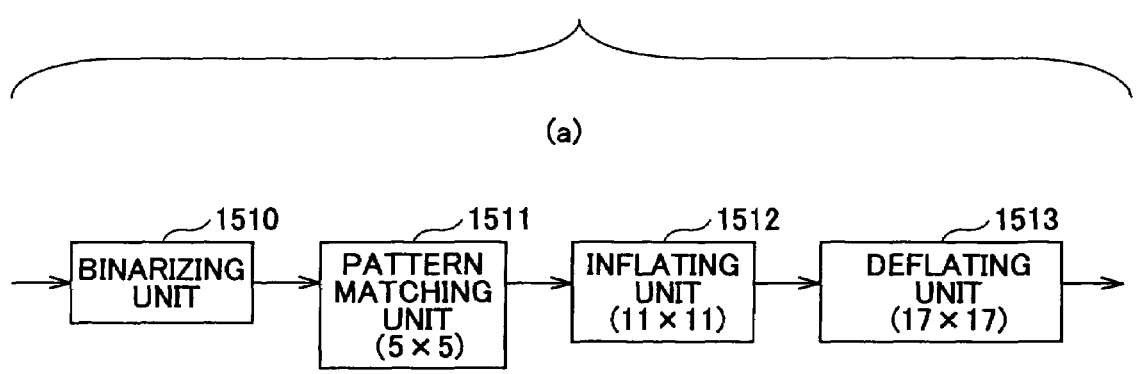
(b)
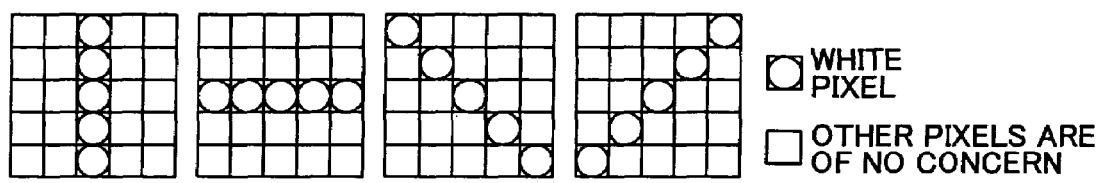
○ WHITE PIXEL
☐ OTHER PIXELS ARE OF NO CONCERN

FIG.21
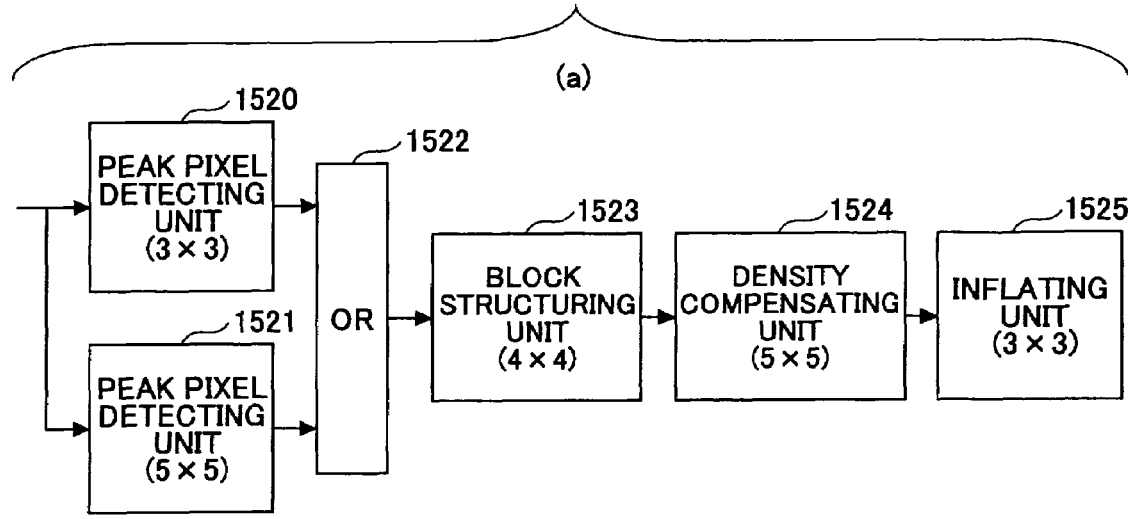
(a)
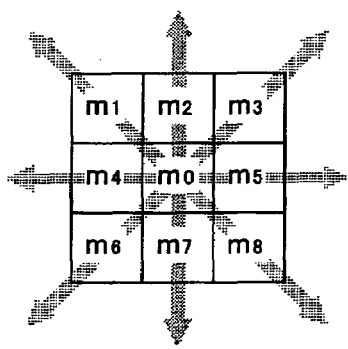
(b) M=3
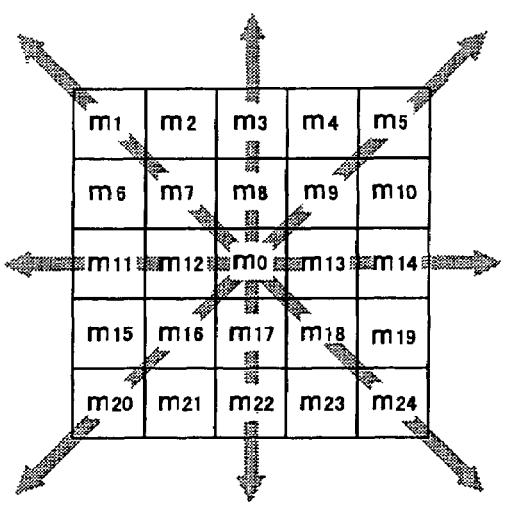
(c) M=5

IMAGE PROCESSING SYSTEM, A METHOD THEREOF, AND A RECORDING MEDIUM THEREOF

PRIORITY

The present application claims priority to and incorporates by reference the entire contents of Japanese priority document 2005-166963, filed in Japan on Jun. 7, 2005.

BACKGROUND OF THE INVENTION

1. Field of the Invention

The present invention generally relates to an image processing system, and especially relates to a suitable technology for an apparatus that rasterizes object information, stores, and transmits the information as a bit map image at a printing process, and an apparatus that determines an attribute, stores, and transmits the attribute as an attribute image at a copying process.

2. Description of the Related Art

Generally, a document drawn up by a computer is printed by a printer through the following processes.

(1) Document data are converted into two or more drawing commands.
(2) The drawing command is analyzed by software known either as a printer driver or a printer controller, and a raster image is generated.
(3) A printer output signal is generated through a color conversion process, a pseudo halftone process, and so on performed on the raster image.
(4) Perform printing.

In order to output a high quality color image by the printer, a color process and a halftone process are required depending on the types of the images, such as a natural image, a graphic image, a line drawing (thin line), and a character. That is, if an image includes two or more of the image types, an optimal image process for each image type is needed.

For example, according to JPA 2000-11191, a document image described by a drawing instruction is developed (expanded) into a bit map image, and a code showing the image typed is included in a bit map image; thereby, the rastering process, wherein the image type is determined with sufficient precision, can be performed with a small capacity memory.

Here, there is a requirement to store the bit map image (also called an attribute image), to which the codes showing the image kinds are developed, with a still smaller storage space. For example, there is a method of storing the attribute information at a low resolution. According to JPA 8-98030, the attribute information for controlling UCR (undercolor removal) is compressed into one set of information per 4×4 pixels, and the compressed information is stored.

However, if resolution is lowered in an attempt to reduce the storage space, quality of the image is degraded. For example, when a character and a thin-line drawing are present on a graphic image, change of image processes for different attributes becomes noticeable at boundaries.

SUMMARY

An image processing system, a method thereof, and a recording medium thereof are described. In one embodiment, an image processing system comprises an image acquiring unit to acquire a drawing instruction, an expanding unit to analyze the drawing instruction and to expand the drawing instruction into an image of bit map, an attribute image generating unit to generate an attribute image based on object information included in the drawing instruction, and a resolution reducing unit to generate a low-resolution attribute image by reducing resolution of the attribute image for every block of a predetermined size, wherein the resolution reducing unit generates a mixture flag that indicates a mixture situation of the attributes in each of the blocks.

BRIEF DESCRIPTION OF THE DRAWINGS

FIG. 2 is a table showing attribute signals corresponding to objects;

FIG. 13 gives maps showing a first example of predictions of the subblock attributes and pixel attributes;

FIG. 14 gives maps showing a second example of predictions of the subblock attributes and pixel attributes;

FIG. 15 is a table showing attribute signals corresponding to objects according to one embodiment of the present invention;

FIG. 19 gives a block diagram and maps for illustrating an edge determination;

FIG. 20 gives a block diagram and a map for illustrating a white background determination;

FIG. 21 gives a block diagram and maps for illustrating a halftone dot determination.

DESCRIPTION OF THE PREFERRED EMBODIMENTS

Figure 1:
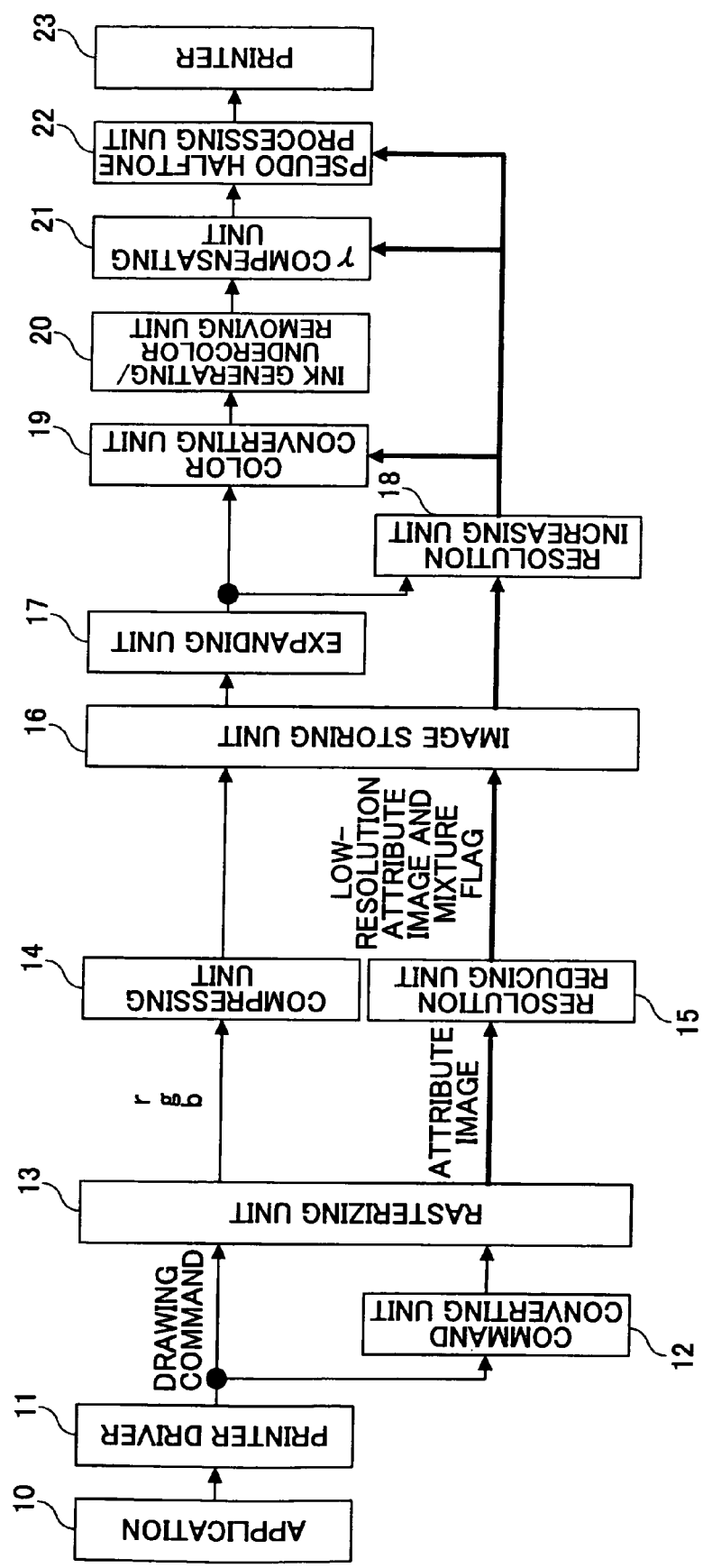
FIG. 1 is a block diagram of one embodiment of the present invention.

Embodiments of the present invention include an image processing system that obtains both a high quality image and reduction of the storage space required for storing an attribute image, a method thereof, and a recording medium thereof that substantially obviate one or more of the problems caused by the limitations and disadvantages of the related art.

Features of embodiments of the present invention are set forth in the description that follows, and in part will become apparent from the description and the accompanying drawings, or may be learned by practice of the invention according to the teachings provided in the description. Problem solutions provided by embodiments of the present invention will be realized and attained by an image processing system that obtains both a high quality and reduction of the storage space for storing the attribute image, a method thereof, and a recording medium thereof particularly pointed out in the specification in such full, clear, concise, and exact terms as to enable a person having ordinary skill in the art to practice the invention.

To achieve these solutions and in accordance with the invention, as embodied and broadly described herein, embodiments of the invention provide as follows.

One embodiment of the present invention includes an image processing system that includes an image acquiring unit for acquiring a drawing instruction, a developing unit for analyzing the drawing instruction and developing (expanding) the drawing instruction into a bit map image, an attribute image generating unit for generating an attribute image based on object information included in the drawing instruction, and a resolution reducing unit for generating a low-resolution attribute image by reducing the resolution of the attribute image for every block of a predetermined size, wherein the resolution reducing unit generates a mixture flag that mixture flag indicates an attribute mixture situation of each block.

According to one embodiment of the present invention, the size of storage is reduced by storing the mixture flag indicating the attribute mixture situation of each block in addition to the low-resolution attribute image is resolution-reduced attribute information. At a subsequent image process, high-resolution attribute information of a block, in which block attributes are mixed, is restored according to the mixture flag and with reference to adjacent pixel information. A high quality image is obtained by applying the restored high-resolution attribute information at the subsequent image process. Restoration of the high-resolution attribute information is enabled by storing the mixture flag.

There are a number of effects of embodiments of the present invention. Some of these effects are given below.

According to one embodiment of the present invention, the volume of the attribute information is reduced (reduction of the required storage capacity and transmission amount) while storing information necessary to obtain a high quality image by generating and storing the low-resolution attribute image and the mixture flag based on the attribute information generated from the object information included in the drawing instruction.

According to one embodiment of the present invention, the volume of the attribute information is reduced (reduction of the required storage capacity and transmission amount) while storing information necessary to obtain a high quality image by generating and storing the low-resolution attribute image and the mixture flag from the attribute information generated from attribute information based on an image.

According to one embodiment of the present invention, the image, the low-resolution attribute image, and the mixture flag are transmitted to an external location through a network; accordingly, the amount of transmission is reduced while information necessary to obtain a high quality image is transmitted as compared with the case where an image and an attribute image of each pixel are transmitted to the external location.

According to one embodiment of the present invention, the image and the low-resolution attribute image are transmitted to the external location through the network; accordingly, the amount of transmission is reduced as compared with the case wherein the image and the attribute image of each pixel are transmitted to the external location.

In one embodiment, the image, the low-resolution attribute image, and the mixture flag are stored; accordingly, a smaller capacity storage is required while the information required to restore a high quality image can be transmitted to the subsequent process as compared with the case wherein the image and the attribute image of each pixel are stored.

In one embodiment, the mixture flag is generated according to an attribute mixture situation and a background image; for this reason, when the attribute information for the high resolution is not required, for example, for an image on a white background, the mixture flag is not set; and in this way, a prediction error when obtaining (attempting to restore) the high resolution can be completely avoided.

In one embodiment, when attributes are intermingled, the resolution reducing unit stores attribute information according to a certain rule such that information that is more important is stored; accordingly, the attributes can be predicted with precision when restoring the high resolution.

In one embodiment, the resolution reducing unit includes a first resolution reducing unit and a second resolution reducing unit, wherein resolution reduction is performed by the second resolution reducing unit with reference to a result of the first resolution reducing unit. Accordingly, information that is more important is stored, and the attribute prediction precision when restoring the high resolution is improved.

In one embodiment, reduction of the volume of the attribute information (therefore, reduction of the required storage capacity and the transmission amount) is realized by implicitly storing the information necessary for obtaining a high quality image, and not by explicitly and individually storing the low-resolution attribute information and the mixture flag.

In one embodiment, when the mixture flag indicates "mixture", the low-resolution attribute image is processed into a high-resolution image by restoring the resolution of the attribute image with reference to adjacent image information (information of adjacent pixels of a low-resolution attribute image and a RGB image), and by performing an image process with reference to the obtained high-resolution attribute information such that a high quality image is reproduced. In this way, both reducing the required storage capacity of the attribute information and obtaining the high quality image are attained.

In one embodiment, a resolution restoring unit includes a first resolution restoring unit and a second resolution restoring unit, wherein resolution restoring is performed by the second resolution restoring unit with reference to a result of the first resolution restoring unit. For this reason, depending on the degree of resolution of the attribute information that is required by each kind of attribute, one of the result of the first resolution restoring unit and a result of the second resolution restoring unit is used as an end result. In this way, a high quality image is obtained with prediction errors being reduced.

In the following, embodiments of the present invention are described with reference to the accompanying drawings.

Embodiment 1

FIG. 1 is a block diagram showing the configuration of an image processing system according to Embodiment 1, which includes an application 10 for providing a printer output instruction, a printer driver 11 for converting the printer output instruction into a drawing command, and a rasterizer 13 for generating an RGB image of a bit map based on the drawing command. Further, the image processing system includes a command converting unit 12 for reading object information from the drawing command, and generating an attribute image. The attribute image includes four types of object information, that is, a character, a thin line, a graphic, and an image; and a "background" (a white background of the image), totaling five types of attributes.

The image processing system further includes a resolution reducing unit 15 for generating a low-resolution attribute image and a mixture flag that represent attribute information for every 4×4 pixels of an original attribute image in which the attribute information is available per pixel. The low-resolution attribute image is stored in an image storing unit 16 with a RGB image that is compressed by a compressing unit 14.

An expanding unit 17 reads and expands the compressed RGB image stored in the image storing unit 16. A resolution restoring unit 18 reads the low-resolution attribute image and the mixture flag stored in the image storing unit 16, and restores the resolution of the low-resolution attribute image, referring to the mixture flag and the expanded RGB image.

According to the attribute information, the resolution of which is restored, an appropriate image process is performed. That is, a process with priority for resolution is performed on the character and the thin line drawing objects, and a process with priority for vividness and gradation of color reproduction is performed on the graphic and the image objects. This is achieved by an appropriate combination of a color converting unit 19, a γ compensating unit 21, and a pseudo halftone processing unit 22. The color converting unit 19, and an ink generating/undercolor removing unit 20 performs a conversion process into a CMYK signal for colors corresponding to printer color materials. Specifically, the color converting unit 19 converts RGB into CMY, and the ink generating/undercolor removing unit 20 converts CMY into CMYK. The γ compensating unit 21 performs 1-dimensional LUT conversion such that compensation of the γ property of the printer and the sharpness of the character and the thin-line objects are enhanced. The pseudo halftone processing unit 22 performs a dither process and the like, and outputs the image after the pseudo halftone process to a printer 23.

Conventionally, when the resolution is not reduced, every pixel has assigned one of four kinds of object information, namely, character, thin line, graphic, and image (a background object being assigned as one of the four kinds). As shown in FIG. 2, the four objects are expressed by 2-bit signals, i.e., 2 bits are required per pixel.

Figure 3:
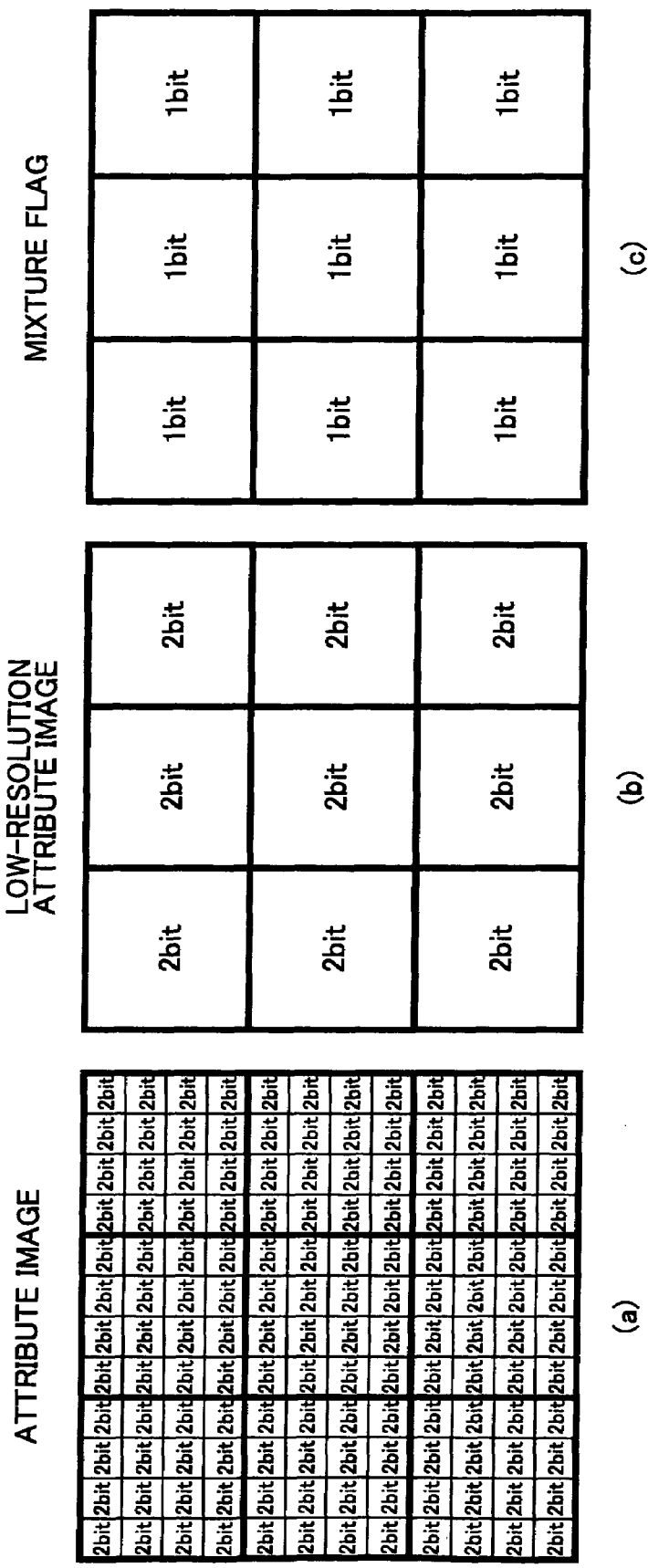
FIG. 3 gives maps showing an attribute image, a corresponding low-resolution attribute image, and corresponding mixture flags according to embodiments of the present invention.

An example of an attribute image constituted by 12×12 small pixels is shown at (a) of FIG. 3, wherein each pixel is assigned 2-bit object information. According to one embodiment of the present embodiment, a low-resolution attribute image is generated, wherein every 4×4 small pixels are represented by a large pixel; that is, the low-resolution attribute image is constituted by 3×3 large pixels as shown at (b) of FIG. 3(*b*), each pixel being assigned 2 bits. Further, as shown at (c), corresponding to each large pixel of the low-resolution attribute image, a 1-bit mixture flag is generated, making a 3×3-pixel matrix.

In this way, the attribute information, which conventionally requires 32 bits (i.e., 2 bits for every 4×4 small pixels), is expressed by 3 bits according to the embodiment, the 3 bits comprising 2 bits for the object information and one bit for the mixture flag for every unit of 4×4 small pixels. That is, according to the embodiment, the number of bits required for the attribute information is reduced to 1/10-1/11 compared with the conventional method.

In the following, the resolution reducing unit 15 and the resolution restoring unit 18 are specifically described.

Figure 4:
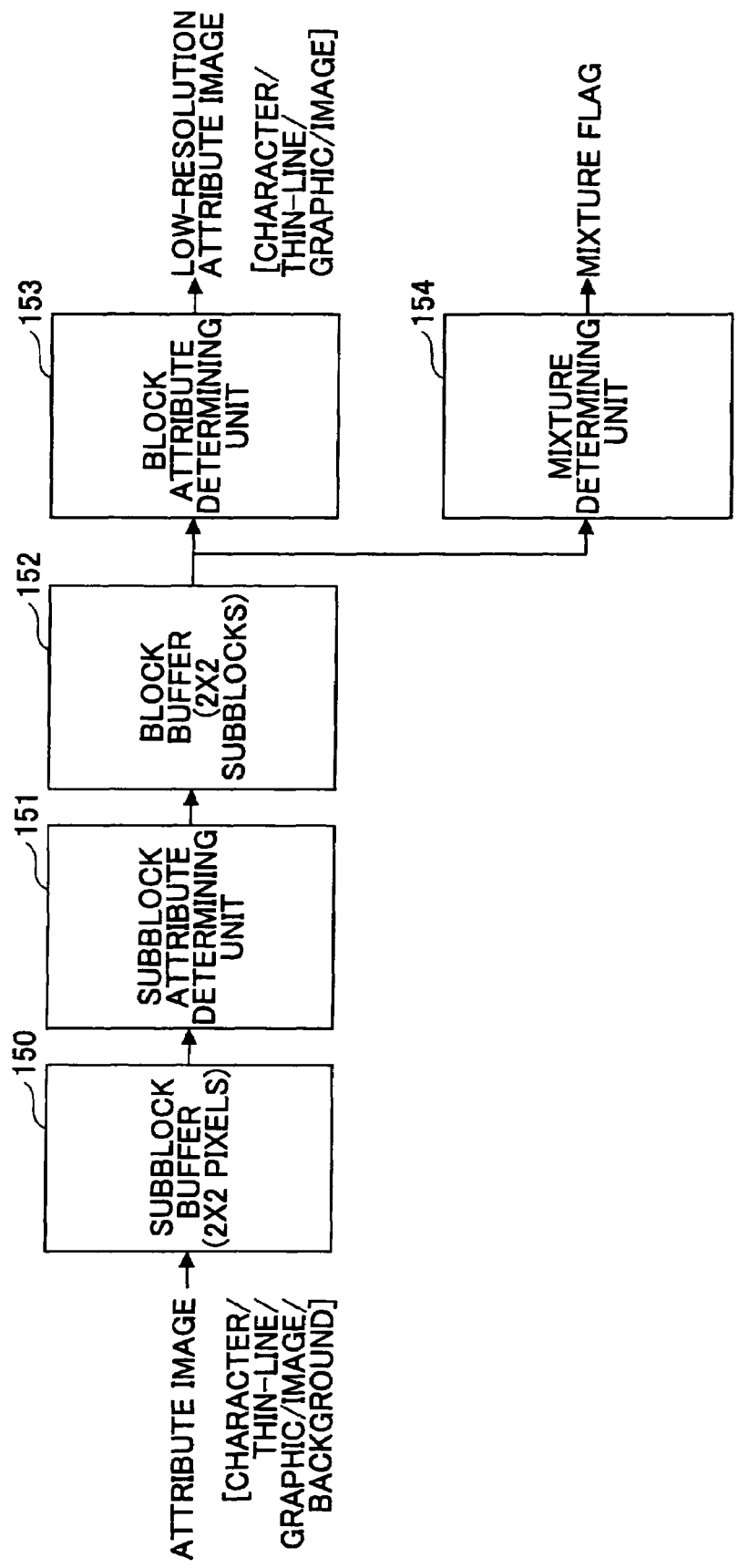
FIG. 4 is a block diagram of a resolution reducing unit.

FIG. 4 shows the configuration of the resolution reducing unit 15. First, the attribute image is provided to a subblock buffer 150, and is divided into 2×2-pixel blocks. The blocks are called subblocks, and a subblock attribute determining unit 151 determines an attribute of each subblock. Next, attribute images of the subblocks in a block buffer 152 are divided into 2×2 subblocks, which are equivalent to 4×4 pixels, and are called blocks. Then, a block attribute determining unit 153 determines the attribute of each block, and a mixture determining unit 154 determines a binary value of the mixture situation of each block. The subblock buffer 150 and the block buffer 152 are buffers for temporarily storing data of a target subblock and a target block, respectively, when determining the attributes of the subblock and the block, respectively.

Figure 5:
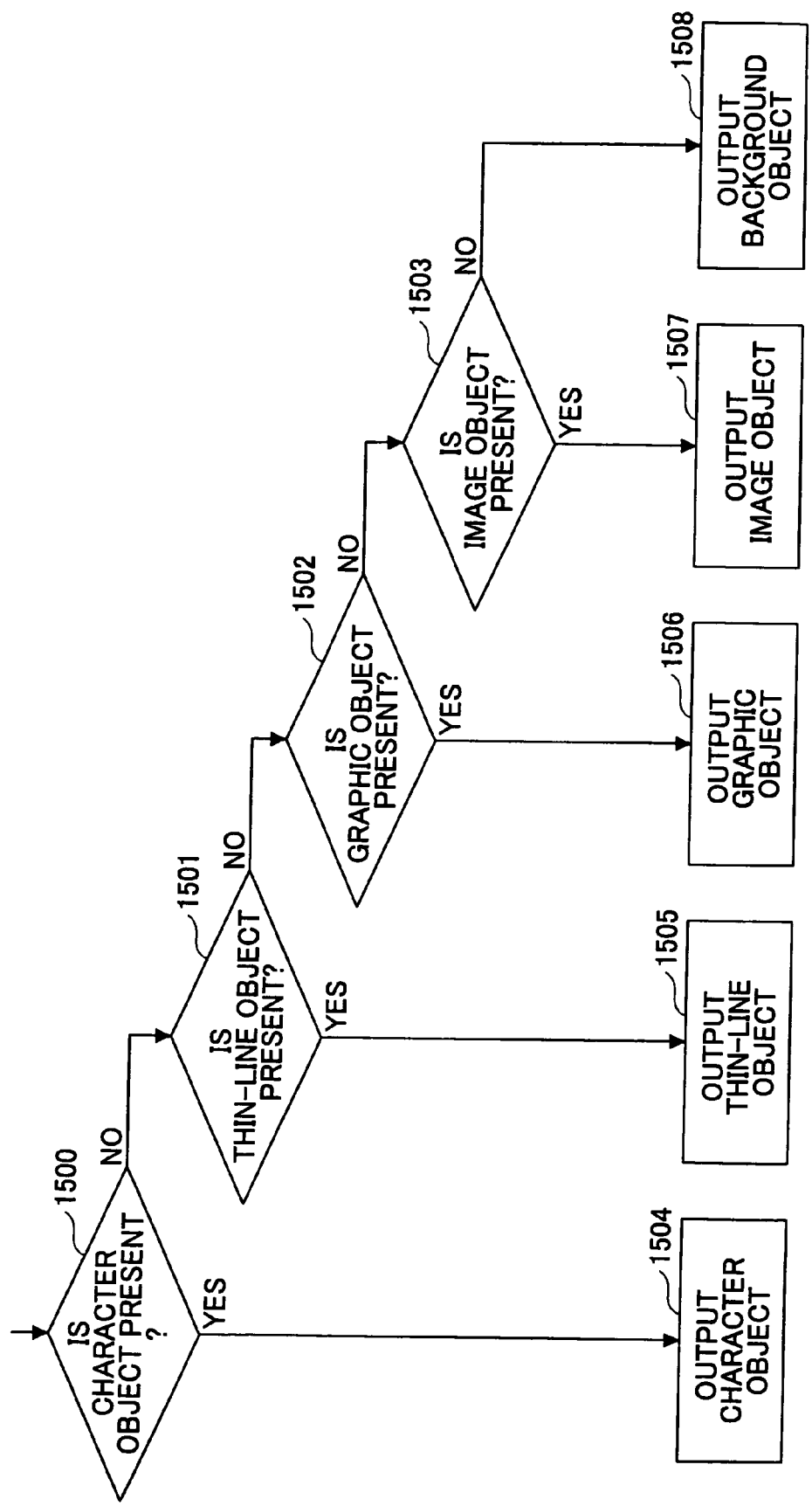
FIG. 5 is a flowchart of a subblock attribute determining process.

FIG. 5 is a flowchart of a process performed by the subblock attribute determining unit 151. If at least one character object is present in a subblock (Yes at Step 1500), the subblock is determined to be a character object (Step 1504). If no character object is present (No at Step 1500), determination is made as to whether a thin-line object is present. If the determination is affirmative (Yes at Step 1501), the subblock is determined to be a thin-line object (Step 1505). If no thin-line object is present (No at Step 1501), a determination is made as to whether a graphic object is present (Step 1502). If the determination is affirmative (Yes at Step 1502), the subblock is determined to be a graphic object (Step 1506). Hereafter, the determination is performed according to the predetermined priority of the objects.

Figure 6:
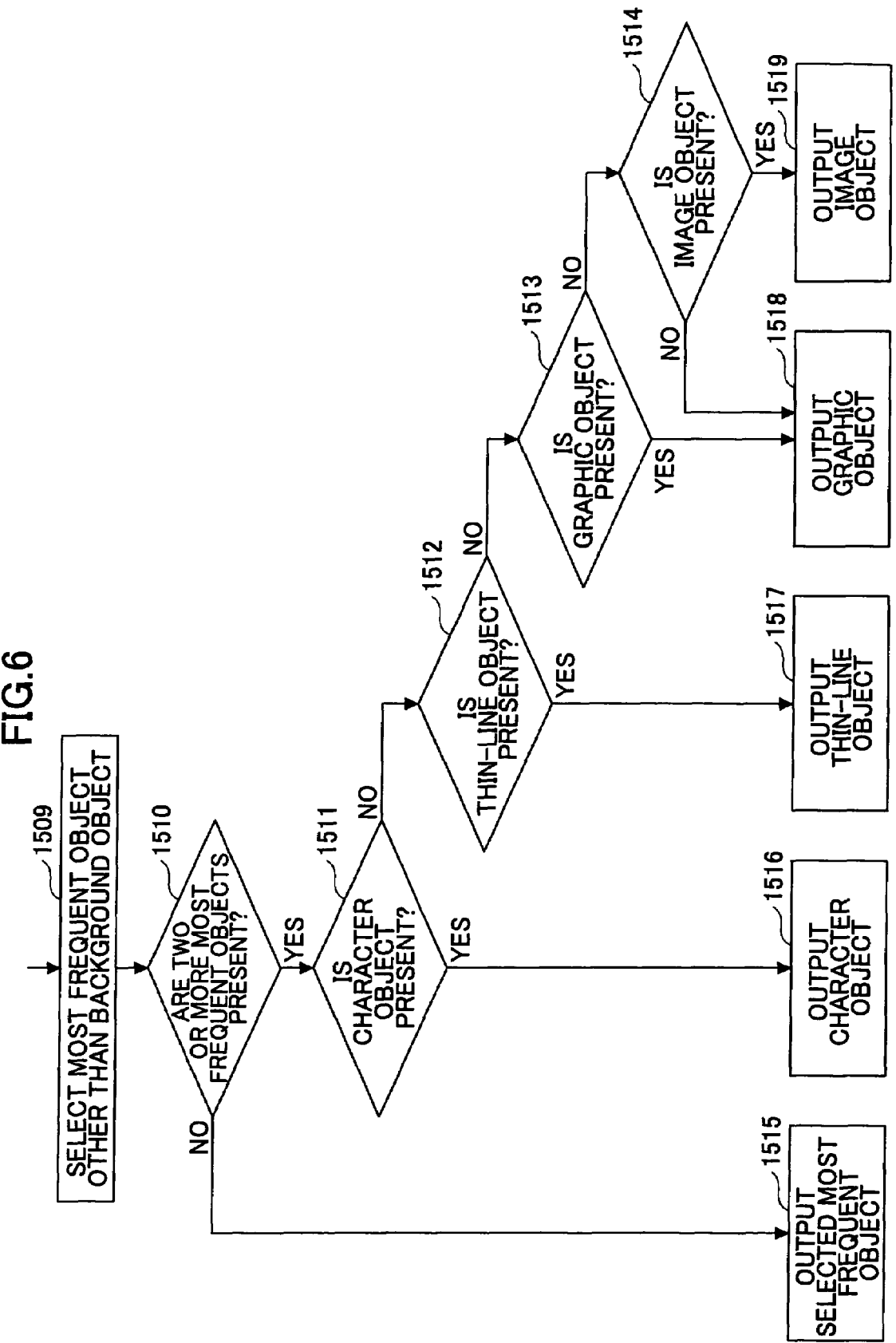
FIG. 6 is a flowchart of a block attribute determining process.

FIG. 6 is a flowchart of a process performed by the block attribute determining unit 153. In principle, based on the determination result of the subblock attribute determining unit 151, an object that appears most frequently is identified and stored as the determination result of the block attribute (Step 1509). However, there is a case in which the appearance frequency of two or more objects is the same and the greatest within a block, which is determined at Step 1510. In this case, the determination is performed according to the predetermined priority of the objects as in determining the subblock attribute. For example, when a block contains 8 subblocks that are determined to be character objects and 8 subblocks that are determined to be graphic objects, the block is determined to be a character object. The background object is assigned the lowest priority regardless of the appearance frequency. When all subblocks are determined to be background objects, the block is treated as another predetermined object (here, it is treated as a graphic object).

Figure 7:
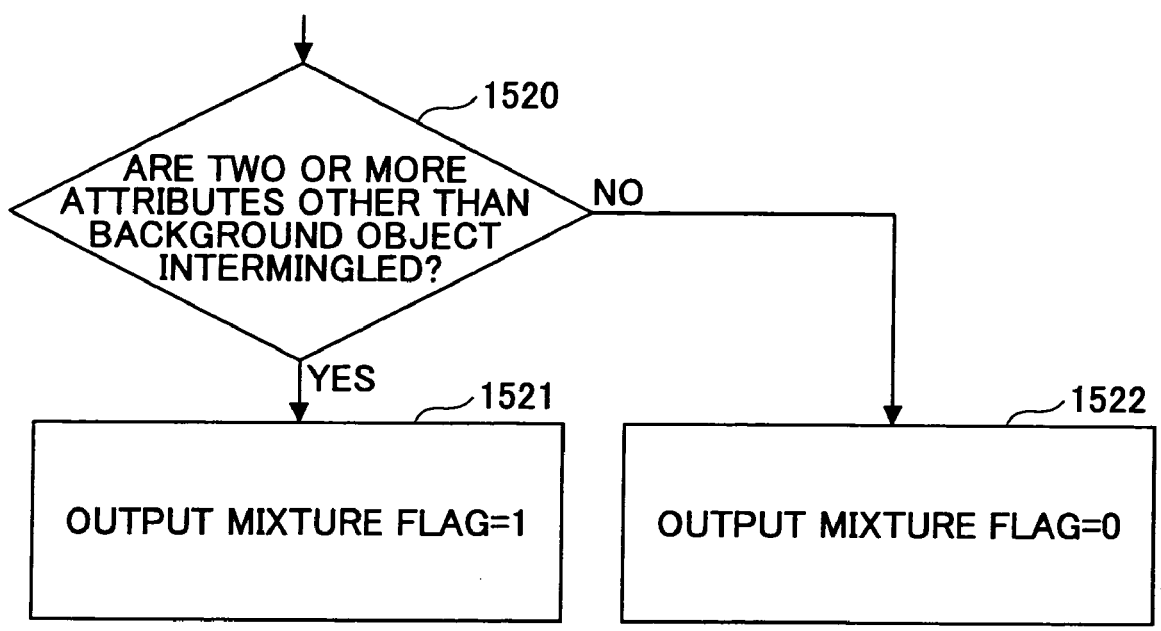
FIG. 7 is a flowchart of a mixture determining process.

FIG. 7 is a flowchart of a process performed by the mixture determining unit 154. Whether two or more objects are intermingled within a block is determined with reference to the determination result of the subblock attribute determining unit 151 (Step 1520). If affirmative (Yes at S1520), a mixture flag "1" is output (Step 1521). Otherwise, if negative (No at S1520), a mixture flag "0" is output (Step 1522). Here, if the mixture is only with a background object, the mixture flag "0" is output.

Figure 8A:
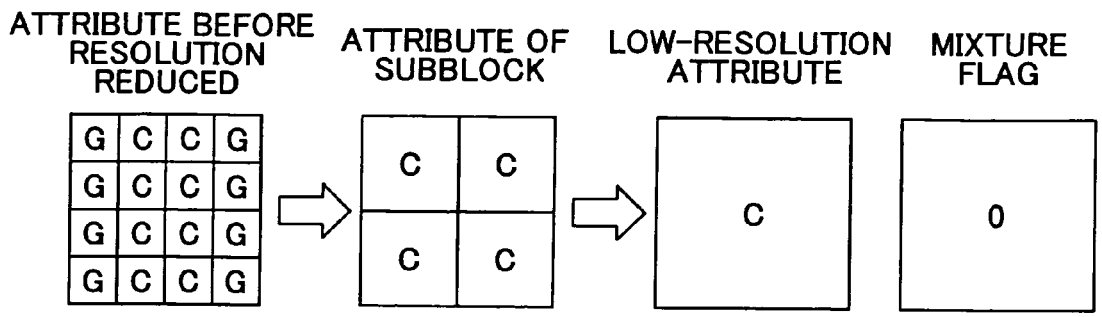
FIGS. 8A, 8B, 8C, and 8D give maps of examples of attribute information, corresponding subblock attributes thereof, corresponding block attributes thereof, and corresponding mixture flags thereof.
Figure 8B:
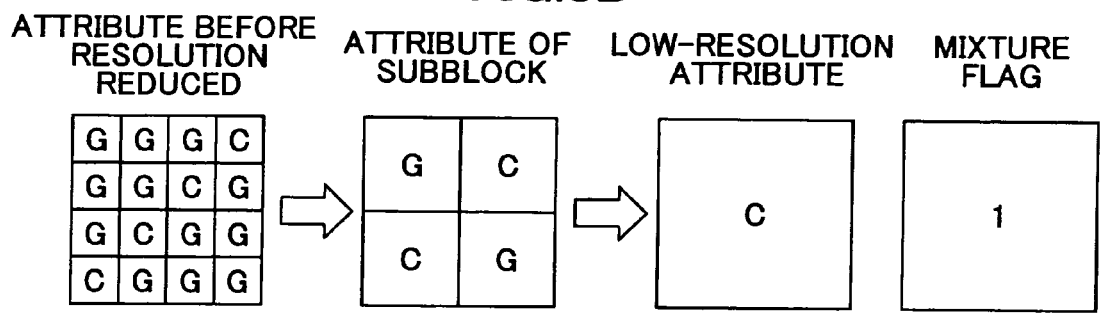
Figure 8C:
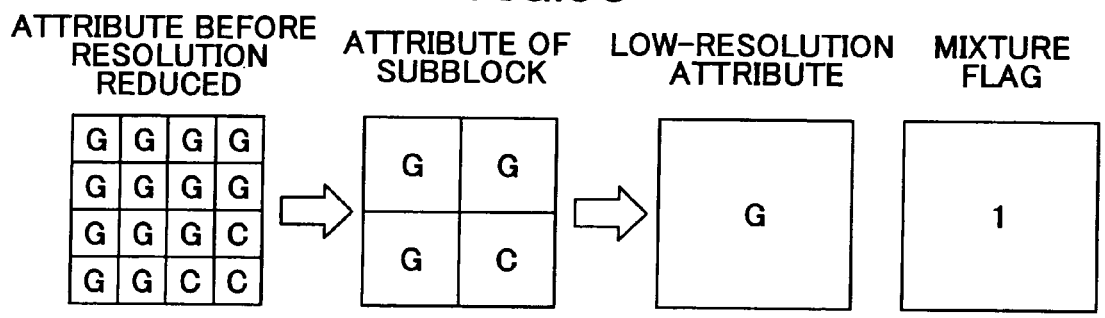
Figure 8D:
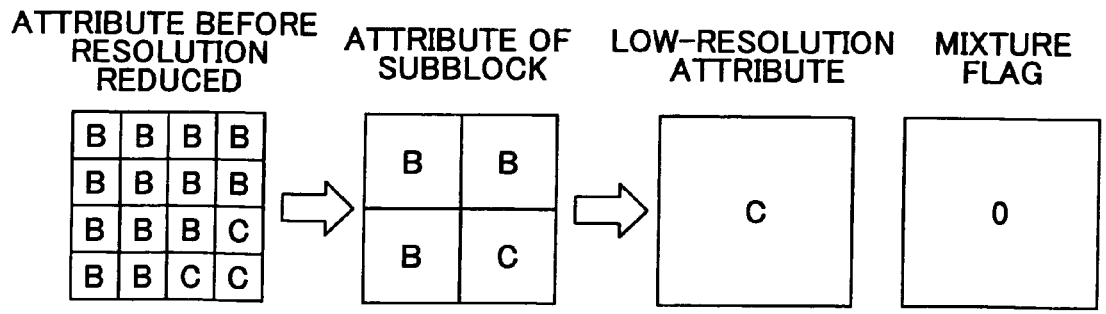

FIGS. 8A, 8B, 8C, and 8D give maps of examples of attribute information, the corresponding subblock attributes thereof, the corresponding block attributes thereof, and the corresponding mixture flags thereof, where "C" represents a character object, "G" represents a graphic object, and "B" represents a background object. That is, FIGS. 8A, 8B, and 8C show the cases wherein "C" and "G" are mixed, and FIG. 8D shows the case wherein "C" and "B" are mixed.

In the case of FIG. 8A, all the 2×2 pixels contain "C"; accordingly, all the subblocks are determined to be "C" subblocks as a result of the subblock attribute determination, and a mixture flag "0" is output. In the case of FIG. 8B, two "C" subblocks, and two "G" subblocks are present as a result of the subblock attribute determination. Although the numbers of the different types of subblocks are the same, i.e., 2, since it is predetermined that a character object has priority, this block is determined to be a "C" block, and a mixture flag "1" is output. In the case of FIG. 8C, three subblocks are "G", being the majority, and the block is determined to be "G", and a mixture flag "1" is output. In the case of FIG. 8D, "C" and "B" are mixed. Since "C" has the priority, the block is determined to be a character object, and a mixture flag "0" is output.

In the case of (d), even if color conversion and a dither process are performed using the information of the character object that greatly overflows into a background, since it is a white (background) portion, there is no influence on quality of image; and, therefore, it is not necessary to output a mixture flag "1".

Figure 9:
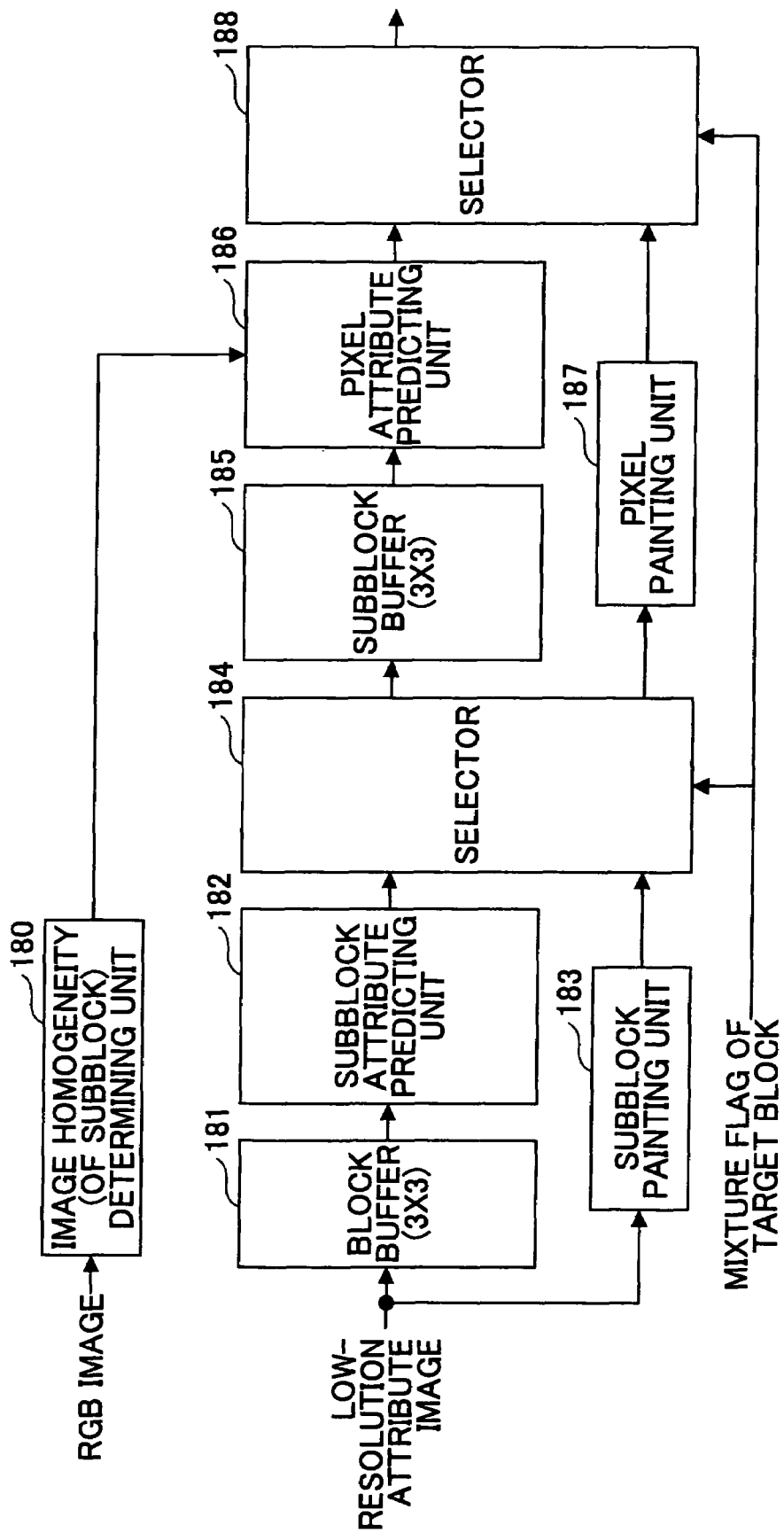
FIG. 9 is a block diagram of a resolution restoring unit.

FIG. 9 shows the configuration of the resolution restoring unit 18. A selector 184 and a selector 188 are for selecting a subblock painting unit 183 and a pixel painting unit 187, respectively, when the mixture flag of a target block indicates "0". The subblock painting unit 183 and the pixel painting unit 187 paint all the pixels in the target block according to the attribute information of the target pixel of the low-resolution attribute image. When the mixture flag indicates "0", the resolution restoring unit 18 does not perform the resolution restoring process. For example, in the cases shown in FIG. 8A and FIG. 8D, all of the 4×4 small pixels (each set of the 4×4 small pixels being represented by a large pixel of a low-resolution attribute image) are made into character objects. In the case of the example shown by FIG. 8A, since the resolution restoring process is not performed by the resolution restoring unit 18, the lines on both sides of the characters are determined to be characters. However, the degree of degradation due to erroneous determination of a single line is small. Further, the danger of mistaking a character for a graphic image due to the resolution restoring process can be avoided.

When the mixture flag indicates "1", the selector 184 and the selector 188 select outputs of a subblock attribute predicting unit 182 and a pixel attribute predicting unit 186, respectively. Then, the resolution restoring process is performed, and the following processing result is output.

The subblock attribute predicting unit 182 predicts an attribute of each subblock, four subblocks constituting a pixel of a low-resolution attribute image. At this time, adjacent 3×3 pixels of a low-resolution attribute image around the target pixel of the low-resolution attribute image are referenced. Next, the pixel attribute predicting unit 186 predicts an attribute of each pixel, four pixels constituting a subblock attribute image. At this time, 3×3 pixels that are adjacent to the target subblock attribute image, and a determination result of an image homogeneity determining unit 180 for determining homogeneity within a subblock are referenced. A block buffer 181 and a subblock buffer 185 are buffers for temporarily storing data of the target block and the target subblock, respectively, in order to realize attribute prediction of the target subblock and the target pixel, respectively, with reference to the adjacent pixel information.

The image homogeneity determining unit 180 determines homogeneity of 2×2 pixels of the RGB image corresponding to the subblock. The difference between the maximum value and the minimum value is taken for each color, and if the difference is less than a predetermined threshold Th for all the colors, the image is determined to be homogeneous. Here, the threshold Th is usually about 0; however, when performing irreversible compression with the compressing unit 14, it is a little greater than 0 in consideration of degradation.

In other words, if Max((Max(R)-Min(R) in 2×2 pixels), ((Max(G)-Min(G) in 2×2 pixels), (Max(B)-Min(B) in 2×2 pixels))<Th, the image is determined to be uniform.

Figure 10:
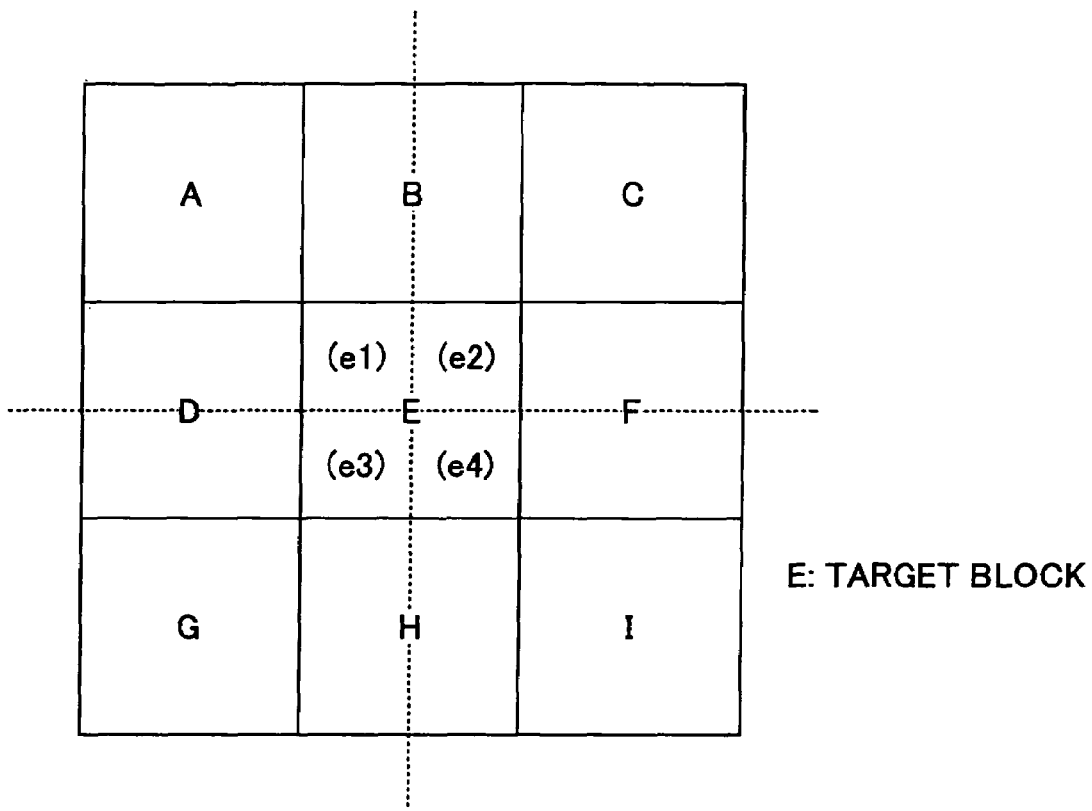
FIG. 10 is a map for illustrating prediction of the subblock attributes.
Figure 11:
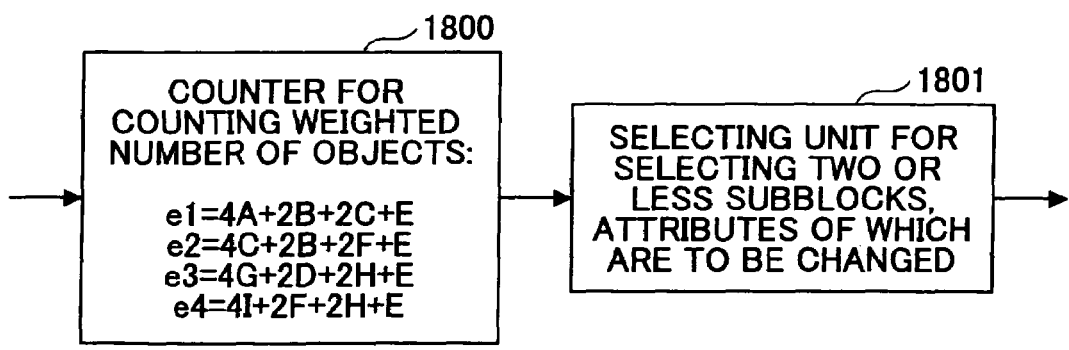
FIG. 11 a block diagram of a subblock attribute predicting unit.

FIG. 11 shows the configuration of the subblock attribute predicting unit 182, and FIG. 10 is a map for illustrating prediction of a subblock attribute. In FIG. 10, E serves as the target block (target pixels of a low-resolution attribute image), which target block is constituted by subblocks e1, e2, e3, and e4, and the attributes of the subblocks e1, e2, e3, and e4 are predicted with reference to the attribute information of adjacent blocks A through I.

Prediction of the subblock attributes of e1 is performed with reference to the attribute information of the blocks ABDE; similarly, the attribute information of the blocks CBFE is referenced for e2, the blocks GDHE are referenced for e3, and the blocks IFHE are referenced for e4. With reference to FIG. 11, a counter 1800 counts weighted numbers of the objects (coefficients); and a selecting unit 1801 selects one or two subblocks, out of the subblocks e1 through e4, the attribute of which subblock(s) is predicted to be different from the attribute of E, and attribute prediction is performed. Selection of the subblock(s) that is/are predicted to have the different attributes is performed by referring to the counted value of attributes other than the attribute of the block E, and by selecting subblock(s), the counted value of which is the first and the second greatest. As for blocks that are not selected, the attribute of the block E is made into the predicted value.

Figure 12:
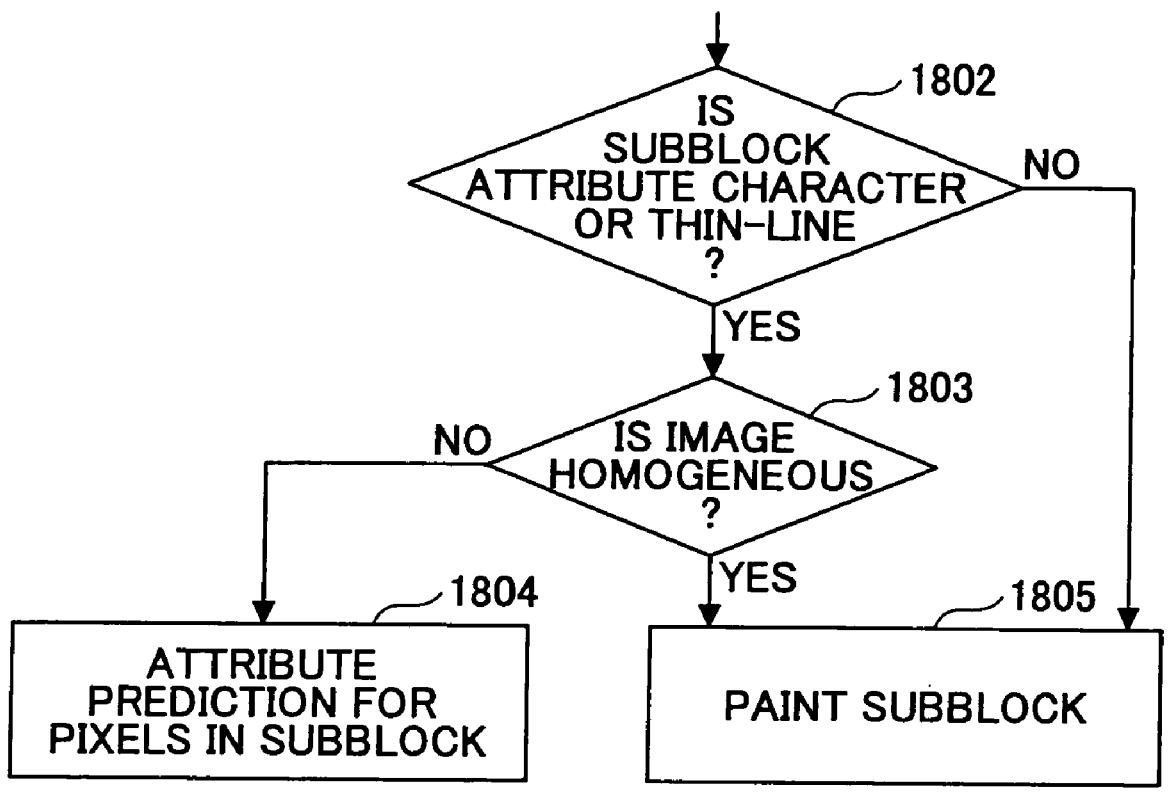
FIG. 12 is a flowchart of a pixel attribute predicting process.

FIG. 12 is a flowchart of a process performed by the pixel attribute predicting unit 186. If the attribute of the target subblock is of a character or a thin line (Yes at step 1802), the resolution is restored. Otherwise, (No at step 1802), the subblock attribute determination is determined to be sufficient, and all the pixels of the subblock are painted with the subblock attribute by the subblock painting unit 183 (Step 1805). Further, even if the attribute is of a character and a thin line, when the image is determined to be homogeneous (Yes at step 1803), an attribute boundary is determined to not be present in the subblock, and the subblock attribute is stored (Step 1805). Otherwise, if the attribute is of a character or a thin line, and if the image is not homogeneous (No at step 1803), attribute prediction of the pixels of the subblock is performed (Step 1804). The method of the attribute prediction for the pixels is the same as the subblock attribute prediction. The target block E of FIG. 11 is made into a subblock E, and the subblocks e1 through e4 are made into the pixels of the subblock. Then, weighted numbers of the objects are counted as shown in FIG. 11; two or less pixels, attributes of which are to be changed, are selected; and the attributes are either changed or stored depending on the counting result.

Prediction determination of a low-resolution attribute image by subblock attribute prediction and pixel attribute prediction is described with reference to FIG. 13 and FIG. 14, wherein "C" represents a character object, "G" represents a graphic object, and "(F)" indicates that the mixture flag is "1". That is, where there is no "(F)", the mixture flag is "0".

A "C" block that is located at the center of the low-resolution attribute image shown at (a) of FIG. 13 is the target block, the mixture flag of which is "1". Weighted count values are given at (c) of FIG. 13, wherein two subblocks have the greatest and the second greatest number of attributes other than the attribute of the block, that is, other than the character object. The two subblocks are located in the upper left and the lower right. The attribute of the two subblocks is changed to graphic object. A situation after the change, which represents a prediction result, is shown at (b) of FIG. 13. Other subblocks having "(F)" are processed in the same manner.

In the case of FIG. 14, paying attention to the mixture flag of the target block of the low-resolution attribute image shown at (a) of FIG. 14, the weighted count values are shown at (c) of FIG. 14. A search is performed for subblocks that have the largest and the second largest counted values of attributes other than the attribute of the block (i.e., other than "G" in this case). A subblock that is located at the upper left has the largest counted value of character objects, which are other than graphic that is the object of the target block. Then, a subblock that has the second largest counted value is searched for. Two subblocks at the upper right and the lower left have the same number of character attributes. Since the number of subblocks that can be selected is two or less in total, the two additional subblocks cannot be selected. In this case, only the one subblock located at the upper left is selected, and the attribute thereof is change into a character object as shown at (b) of FIG. 14.

A result of pixel attribute prediction for the subblock that is determined to be a character object as the subblock attribute prediction result, and not an image homogeneous is shown at (d) of FIG. 13. Resolution can be restored as for a one-line width in diagonal directions. At (d) of FIG. 14, a result of pixel attribute prediction, wherein a subblock out of subblocks determined to be character objects, the subblock being located at a corner, is determined not to be image homogeneous. In this way, roundness of the corner is restored.

As described above, according to this embodiment, storage capacity requirement is reduced by converting the attribute image of 4×4 pixels into the low-resolution attribute image and the mixture flag, which are stored with the image. When processing the stored image, the resolution of the attribute image is restored with reference to the adjacent low-resolution attribute images and the stored image if the mixture flag is "1", and the restored attribute image is applied to the subsequent image process such that a high quality image is reproduced.

Embodiment 2

According to Embodiment 1, the low-resolution attribute image and the mixture flag are explicitly and individually stored. In contrast, according to Embodiment 2, the low-resolution attribute image and the mixture flag are not explicitly divided, but are implicitly stored.

Figure 16:
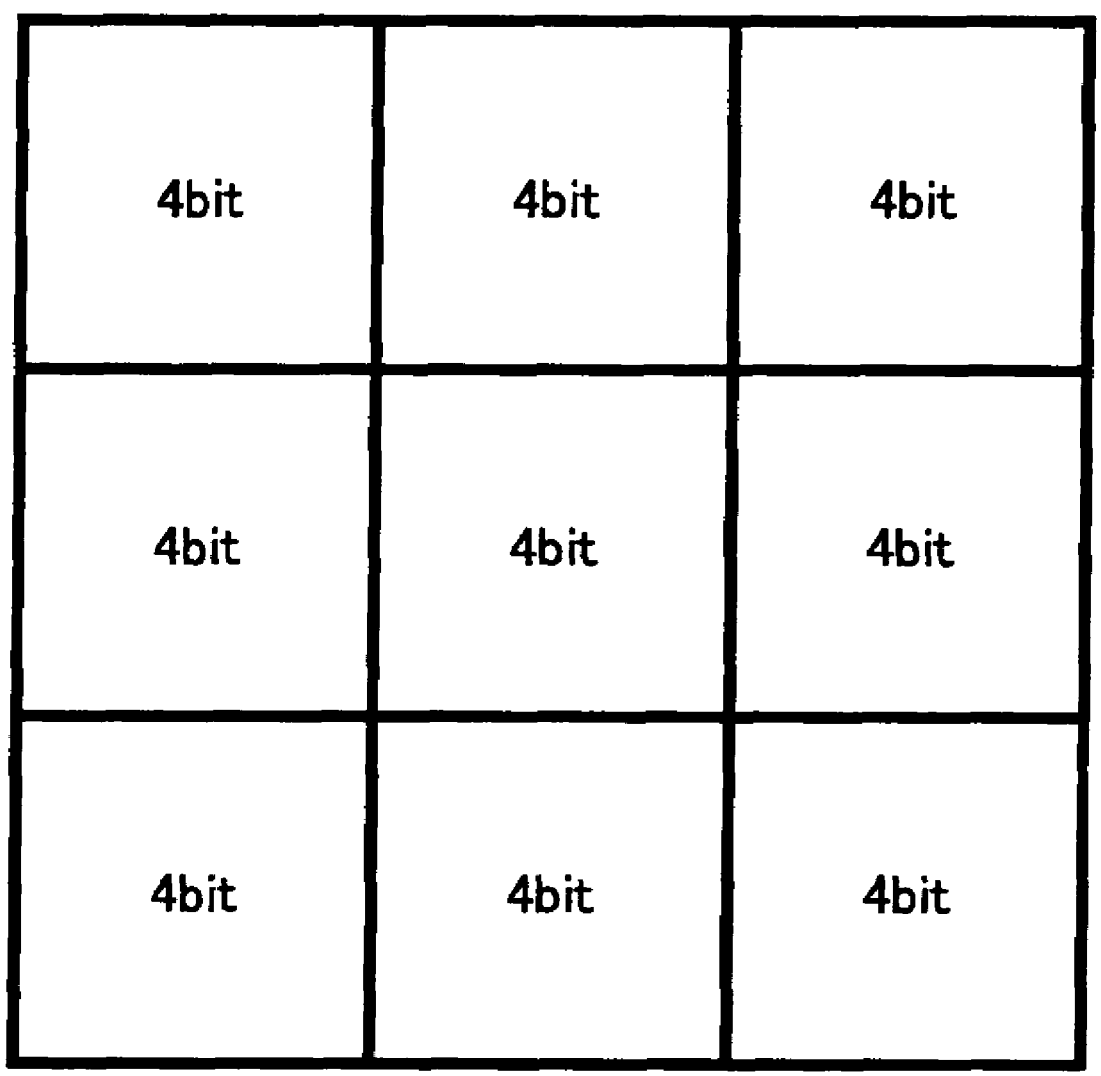
FIG. 16 is a map of a low-resolution attribute image according to an embodiment.

The resolution reducing unit 15 according to Embodiment 2 generates a 4-bit low-resolution attribute image according to a table given by FIG. 15. Out of 4-bit attribute signals, 0000 through 0011 represent situations where the mixture flag is "0", other signals representing situations where the mixture flag is "1". That is, while 32 bits are conventionally required by 4×4 pixels, Embodiment 2 requires only 4 bits (FIG. 16). Accordingly, the storage capacity requirement of the attribute information is reduced.

As described above, according to Embodiment 2, by implicitly storing the mixture flag in the low-resolution attribute image, a high quality image is obtained with the reduced storage capacity.

Embodiment 3

Figure 17:
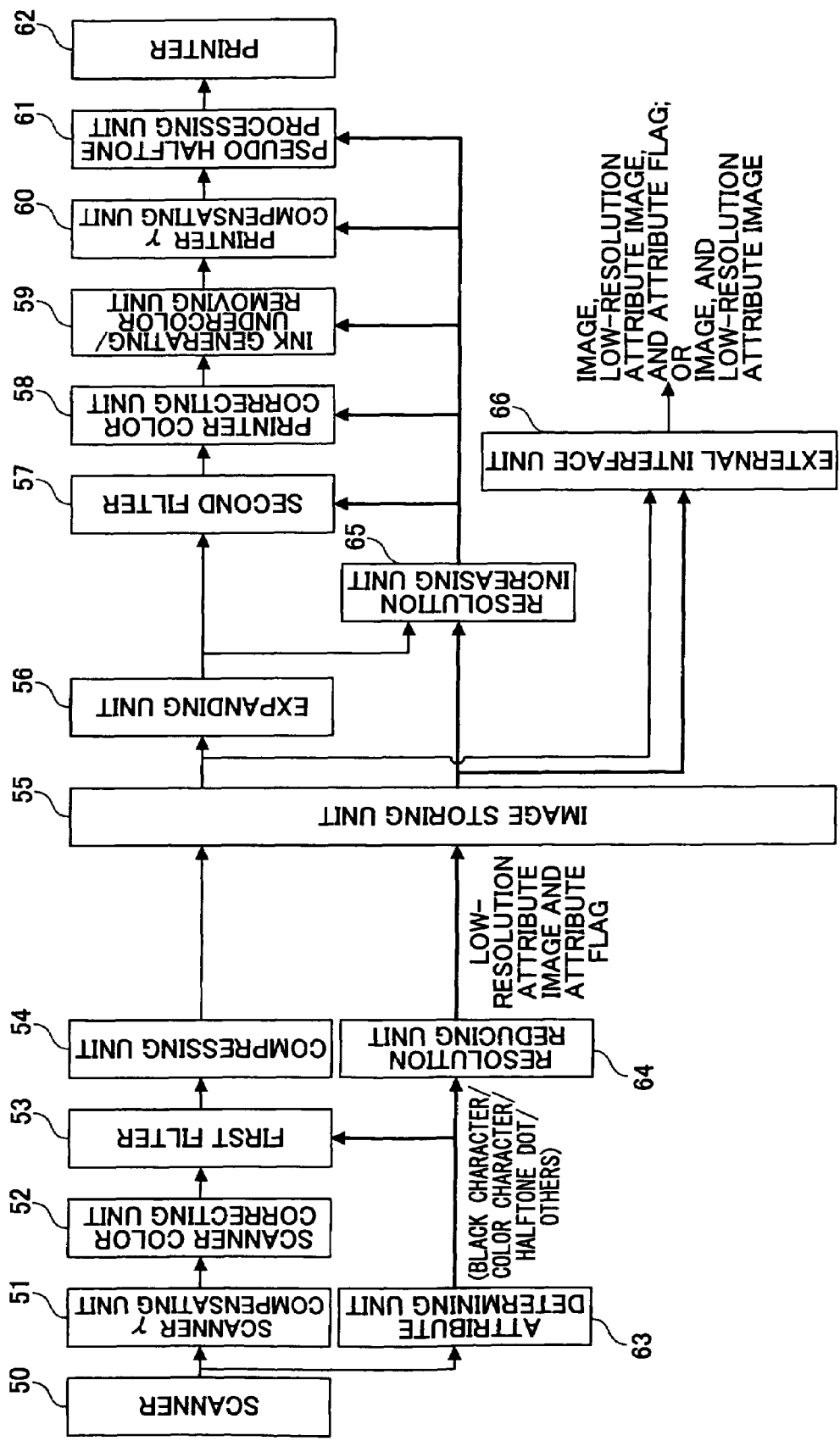
FIG. 17 is a block diagram of an embodiment of the present invention.

An embodiment of the present invention is applicable not only to a printer but also to a copying process. FIG. 17 shows the configuration of the image processing system according to Embodiment 3, wherein the present invention is applied to the copying process. A scanner 50 reads a manuscript, acquires a color image signal that is a RGB signal. A scanner γ compensating unit 51 rectifies a γ property of the scanner 50 by 1-dimensional LUT conversion. A scanner color correcting unit 52 converts the RGB signal that is device dependent into a device independent signal such as sYCbCr. A first filter 53 performs smoothing and edge emphasis by applying filtering suitable to a black character, a color character, and a halftone dot based on attribute information of the scanner input image provided by an attribute determining unit 63 as described below.

The attribute determining unit 63 determines whether a pixel is of a black character, a color character, a halftone dot, or others (including a continuous tone image of a non-halftone dot). Then, based on a determined result, a resolution reducing unit 64 generates a low-resolution attribute image and an attribute flag, which are stored by an image storing unit 55.

Figure 18:
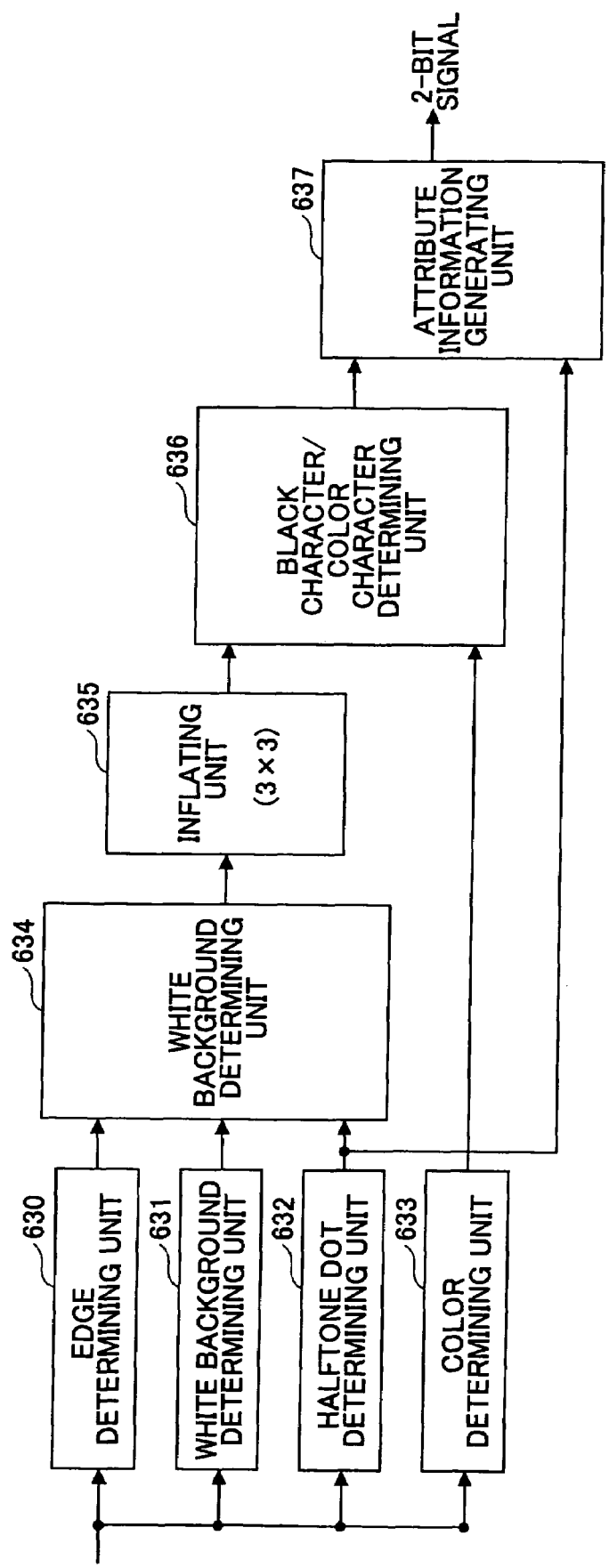
FIG. 18 is a block diagram showing an example of an attribute determining unit according to an embodiment.

FIG. 18 shows an example of the configuration of the attribute determining unit 63 that includes an edge determining unit 630 for determining an edge section of a character or a line drawing, a white background determining unit 631 for determining a white portion, a halftone dot determining unit 632 for determining a pattern section drawn by a halftone dot, and a color determining unit 633 for determining a color portion. The attribute determining unit 63 further includes a character edge on white background determining unit 634, an inflating unit 635, a black character/color character determining unit 636, and an attribute information generating unit 637. The character edge on white background determining unit 634 determines a character edge candidate pixel based on determination results of the edge determining unit 630, the white background determining unit 631, and the halftone dot determining unit 632. That is, in the case of the edge, the white background, and non-dot, the character edge on white background determining unit 634 determines the pixel to be a character edge candidate. In addition, the determination of a character edge candidate pixel is not limited to this.

The edge determining unit 630 detects a dot as a character edge candidate pixel, the dot being an inner side edge that is inside a character or a line drawing, and an outside edge that is outside of the character or the line drawing. The 2 dots (one each on the inside and on the outside) are not sufficient for the filtering process by the first filter 53; accordingly, an expanding process is performed by the inflating unit 635 to obtain a "character edge" as a result. The inflating unit 635 looks at, e.g., 3×3 character edge candidate pixels, with the target pixel being at the center, and makes the target pixel a character edge if there is at least one character edge candidate pixel. Although the magnitude of expansion is described as 3×3 here, this is for example only. In consideration of magnitude of expansion required of color gap properties of the scanner 50 and filtering by the first filter 53, other magnitudes such as 5×5 may be used.

The black character/color character determining unit 636 determines whether a pixel is of a black character or a color character based on the character edge and a result of the color determining unit 633. In the case of a character edge and a color, the pixel is determined to be of a "color character". In the case of a character edge and colorless, the pixel is determined to be of a "black character". The attribute information generating unit 637 determines an attribute of a pixel based on, in addition to "black character" and "color character", a "halftone dot" signal that is a result of the halftone dot determining unit 632, the "halftone dot" signal being used in the filtering process.

The resolution restoring unit 65 restores the resolution of the attribute information as in the case of the printer (Embodiment 1), and the resolution-restored attribute information is applied to each process. A second filter 57 performs an especially important process in the present copying process, performs an emphasis process of raising sharpness of an edge section that may be degraded when scanning and through compression, and performs an intensified emphasis process especially on a character section. In addition, an image that is processed by the second filter 57 is converted into CMY by a printer color correcting unit 58, and is further converted into CMYK by an ink generating/undercolor removing unit 59 (according to attribute information, ink volume and the amount of undercolor removal are increased if printing a black character). A printer γ compensating unit 60 performs γ conversion by 1-dimensional LUT to a CMYK signal (LUTs for a character, a color character, a halftone dot, etc., are prepared, and are selected according to the attribute information). A pseudo halftone processing unit 61 performs a halftone process using a greater number of lines to characters (a black character and a color character), and a smaller number of lines to other areas, and outputs a processed result to a printer 62.

The image stored in the image storing unit 55, the low-resolution attribute image, and the mixture flag may be output and transmitted to an external device (location) through an external interface 66 such as an external printer. The external printer performs an image process with reference to the attribute information. Another embodiment can be implemented wherein the mixture flag is not provided to the external device, but only the image and attribute information are provided. This is because there may be an apparatus that does not have a resolution restoring function.

In the following, the edge determining unit 630, the white background determining unit 631, the halftone dot determining unit 632, and the color determining unit 633 are described.

FIG. 19 shows the configuration of the edge determining unit 630 at (a), the edge determining unit 630 including a trinarizing unit 1500 for expressing a G signal, out of a RGB signal each consisting of 8 bits, with 3 values defined by two threshold values th1 and th2 (th1<th2). Here in this example, 0 represents black, 255 represents white; further if 0<=G<=th1, it is a black pixel, if th1<G<th2, it is a gray pixel, and if th2<=G<=255, it is a white pixel.

If a pattern of black pixels in a 3×3 matrix matches with any one of patterns shown at (b) of FIG. 19, a black pixel pattern matching unit 1501 determines that the target pixel at the center is a contiguous black pixel. Similarly, if a pattern of white pixels matches any one of patterns shown at (c) of FIG. 19, a white pixel pattern matching unit 1502 determines that the target pixel is a contiguous white pixel. Counters 1503 and 1504 count the contiguous black pixels and contiguous white pixels, respectively, in the 3×3 pixel matrix with the target pixel being at the center. If the number of contiguous pixels is equal to or greater than a predetermined value, for example, 2, "1" is output. If both counters 1503 and 1504 output "1", an AND circuit 1505 determines that the target pixel is part of an edge section. That is, the determination is made based on the fact that contiguous white pixels and contiguous black pixels are simultaneously present at a density greater than a predetermined density at an edge section of a character.

FIG. 20 shows the configuration of a white background determining unit 631 that includes a binarizing unit 1510 for determining whether the G signal represents a white pixel or a black pixel by two values. Then, whether the white pixel is a contiguous white pixel is determined by a pattern matching unit 1511 with reference to patterns shown at (b) of FIG. 20.

The patterns are for testing the contiguousness of white pixels in all the directions, that is, two diagonal directions, vertical directions, and horizontal directions. If the white pixel constitutes any one of the patterns, the white pixel is finally determined to be a white pixel; otherwise, the white pixel is determined to be an isolated white pixel, and is changed to a black pixel, that is, the isolated white pixel is removed. An inflating unit 1512 refers to a matrix of 11×11 pixels, with the target pixel being at the center, and replaces the target pixel with a white pixel if there is at least one white pixel in the 11×11 matrix. A deflating unit 1513 refers to a matrix of 17×17 pixels, with the target pixel being at the center, and replaces the target pixel with a black pixel if there is at least one black pixel in the matrix. An area that is constituted by remaining white pixels after the deflating process is finally determined to be a white pixel area.

FIG. 21 shows the configuration of a halftone dot determining unit 152 for determining a halftone dot based on a peak pixel detection method. According to the peak pixel detection method, whether the target pixel is a pole, i.e., a peak or valley, of concentration distribution is determined based on concentration relations with adjacent pixels. If the concentration level of the target pixel is higher than, or lower than, all other pixels in a matrix of M×M pixels, whether the target pixel is the pole is determined by the following formula (1) or the formula (2). A peak pixel detecting unit 1520 detects the peak pixel by the formula (1), and a peak pixel detecting unit 1521 detects the peak pixel by the formula (2).

(1) M=3 ((b) of FIG. 21)

$|2m0-m1-m8| >= \Delta mTH$ and $|2m0-m2-m7| >= \Delta mTH$ and $|2m0-m3-m6| >= \Delta mTH$ and $|2m0-m4-m5| >= \Delta mTH$       Formula (1)

(2) M=5 ((c) of FIG. 21)

$|2m0-m3-m22| >= \Delta mTH$ and $|2m0-m8-m17| >= \Delta mTH$ and $|2m0-m1-m24| >= \Delta mTH$ and $|2m0-m7-m18| >= \Delta mTH$       Formula (2)

That is, if an absolute value of a concentration difference between the target pixel and an average of two pixels that are in symmetric positions with reference to the target pixel is equal to or greater than a threshold ΔmTH, the target pixel is determined to be a peak. Although a peak pixel may be detected from the RGB signal, the peak pixel may be detected based only on the G signal for simplicity. Then, whether the area is a halftone dot area is determined based on the peak pixel information. Next, an OR circuit 1522 performs an ORing of detection results of the peak pixel detecting unit 1520 and the peak pixel detecting unit 1521. A block structuring unit 1523 determines a block is active if there is at least one peak pixel in the block that consists of 4×4 pixels. A density compensating unit 1524 counts the number of active blocks in a matrix of 5×5 blocks, wherein the target block is at the center, and determines the target block to be a halftone dot block if the number of active blocks is greater than a predetermined value. An inflating unit 1525 refers to 3×3 blocks, and determines the target block to be a halftone dot area if at least one halftone dot block is present.

Figure 22:
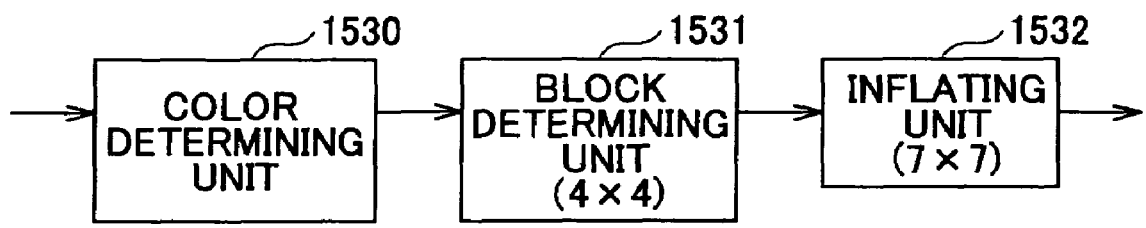
FIG. 22 is a block diagram of a color determination.

FIG. 22 shows the configuration of a color determining unit 1530. The color determining unit 1530 determines a pixel that suffices Max (|R-G|, |G-B|, |B-R|)>th3 (th3 is a predetermined threshold) as a color pixel. A block determining unit 1531 determines a block to be active if at least one color pixel is present for every block that consists of 4×4 pixels. An inflating unit 1532 determines the target block to be a color area if at least one active block is present in 7×7 blocks.

As described above, according to Embodiment 3, a high quality image is obtained with the reduced memory requirement by storing the low-resolution attribute image and the mixture flag in the copying process. Further, when working with an external apparatus such as a printer, the amount of transmission is reduced since only an image, a low-resolution attribute image, and a mixture flag, or only an image and a low-resolution attribute image may be transmitted. Further, if the external apparatus is capable of restoring the resolution, a high quality image can be obtained.

Further, the present invention can be implemented by providing a storage medium that stores a program code of software that realizes the process and the function of embodiments described above to a system or an apparatus, and a computer (CPU and MPU) of the system or the apparatus reading and executing the program code stored in the storage medium. In this case, the process and the function of embodiments are performed by the program code read from the storage medium. As the storage medium for storing and providing the program code, a flexible disk, a hard disk, an optical disk, a magneto-optical disk, a magnetic tape, a non-volatile memory card, ROM, etc., can be used. Further, the present invention includes not only the case wherein the program code is executed for performing the processes of embodiments as described above, but also the case wherein a part or all of the process is performed by an OS (operating system) operated by the computer based on directions of the program code. Furthermore, the present invention can be implemented by storing the program code read from the storage medium in a storage that is provided to an expansion unit connected to the computer or an expansion board inserted into the computer, and by a CPU, and the like, provided on the expansion board or the expansion unit executing the program code for performing a part or all of the process, thereby performing the functions of embodiments.

Further, the present invention is not limited to these embodiments, but variations and modifications may be made without departing from the scope of the present invention.

What is claimed is:

1. An image processing system, comprising:
a computer processor including:
an image acquiring unit to acquire a drawing instruction;
an expanding unit to analyze the drawing instruction and to expand the drawing instruction into an image of bit map;
an attribute image generating unit to generate an attribute image based on object information included in the drawing instruction; and
a resolution reducing unit to generate a low-resolution attribute image by reducing resolution of the attribute image for every block of a predetermined size;
wherein the resolution reducing unit generates a mixture flag that indicates a mixture situation of the attributes in each of the blocks,
wherein the number of bits of the mixture flag for each of the blocks is smaller than the number of bits of the low-resolution attribute image for each of the blocks.

2. The image processing system as claimed in claim 1, further comprising: a transmitting unit to transmit the image, the low-resolution attribute image, and the mixture flag to an external instrument through a network.

3. The image processing system as claimed in claim 1, further comprising: a transmitting unit to transmit the image and the low-resolution attribute image to an external instrument through a network.

4. The image processing system as claimed in claim 1, further comprising: a storing unit to store the image, the low-resolution attribute image, and the mixture flag.

5. The image processing system as claimed in claim 1, wherein the resolution reducing unit generates the mixture flag according to the mixture situation of the attributes and a background image.

6. The image processing system as claimed in claim 1, wherein the resolution reducing unit preferentially stores attribute information, frequency of occurrence of which in a block is the greatest when the attributes are intermingled.

7. The image processing system as claimed in claim 1, wherein the resolution reducing unit stores a predetermined attribute when the attributes are intermingled.

8. The image processing system as claimed in claim 1, wherein the resolution reducing unit includes a first resolution reducing unit and a second resolution reducing unit, wherein the second resolution reducing unit refers to a result of the first resolution reducing unit.

9. The image processing system as claimed in claim 1, wherein the resolution reducing unit stores combination information of the intermingled attributes when the attributes are intermingled.

10. The image processing system as claimed in claim 1, further comprising a resolution restoring unit to restore the resolution of the low-resolution attribute image based on the low-resolution attribute image and the mixture flag;
wherein, if the mixture flag indicates that the attributes are intermingled in a restored block corresponding to a target pixel of the low-resolution attribute image, the attribute image of the restored block is generated with reference to adjacent pixel information.

11. The image processing system as claimed in claim 10, wherein the adjacent pixel information that is referred to by the resolution restoring unit is adjacent pixel information of the low-resolution attribute image.

12. The image processing system as claimed in claim 10, wherein the adjacent pixel information referred to by the resolution restoring unit is adjacent pixel information of the image acquired by one of the expanding unit and the image acquiring unit.

13. The image processing system as claimed in claim 10, wherein the resolution restoring unit includes a first resolution restoring unit and a second resolution restoring unit, wherein the second resolution restoring unit refers to a result of the first resolution restoring unit.

14. An image processing system, comprising:
a computer processor including:
an image acquiring unit to acquire an image;
an attribute determining unit to determine an attribute of every pixel of the acquired image, and to generate an attribute image that includes a respective attribute for each pixel of the acquired image; and
a resolution reducing unit to generate a low-resolution attribute image by reducing resolution of the attribute image for every block of a predetermined size;
wherein the resolution reducing unit generates a mixture flag that indicates a mixture situation of the attributes in each of the blocks, wherein the number of bits of the mixture flag for each of the blocks is smaller than the number of bits of the low-resolution attribute image for each of the blocks.

15. An image processing method, comprising:

acquiring a drawing instruction;

analyzing the drawing instruction, and expanding the drawing instruction into a bit map image; and generating an attribute image based on object information included in the drawing instruction; and generating a low-resolution attribute image by reducing resolution of the attribute image for every block of a predetermined size, including generating a mixture flag that indicates a mixture situation of the attributes in the block, wherein the number of bits of the mixture flag for each of the blocks is smaller than the number of bits of the low-resolution attribute image for each of the blocks.

16. A computer-readable storage medium that stores a computer-executable program which, when executed by a computer, causes the computer to perform the image processing method as claimed in claim 15.

* * * * *